United States Patent
Hishiki

(10) Patent No.: US 12,351,662 B2
(45) Date of Patent: Jul. 8, 2025

(54) OPTICAL RESIN COMPOSITION MANUFACTURING METHOD AND OPTICAL RESIN COMPOSITION

(71) Applicant: NITTO DENKO CORPORATION, Ibaraki (JP)

(72) Inventor: Tomoaki Hishiki, Osaka (JP)

(73) Assignee: NITTO DENKO CORPORATION, Ibaraki (JP)

(*) Notice: Subject to any disclaimer, the term of this patent is extended or adjusted under 35 U.S.C. 154(b) by 615 days.

(21) Appl. No.: 17/782,337

(22) PCT Filed: Dec. 4, 2020

(86) PCT No.: PCT/JP2020/045276
§ 371 (c)(1),
(2) Date: Jun. 3, 2022

(87) PCT Pub. No.: WO2021/112232
PCT Pub. Date: Jun. 10, 2021

(65) Prior Publication Data
US 2023/0060316 A1    Mar. 2, 2023

(30) Foreign Application Priority Data
Dec. 4, 2019 (JP) .................. 2019-219758

(51) Int. Cl.
*C08F 214/18* (2006.01)
*C08F 4/34* (2006.01)
*C08F 8/00* (2006.01)
*C08F 8/26* (2006.01)

(52) U.S. Cl.
CPC .......... *C08F 214/182* (2013.01); *C08F 4/34* (2013.01); *C08F 8/00* (2013.01); *C08F 2810/40* (2013.01)

(58) Field of Classification Search
CPC .... C08F 214/182; C08F 8/00; C08F 2810/40; C08F 8/26
See application file for complete search history.

(56) References Cited

U.S. PATENT DOCUMENTS

| | | |
|---|---|---|
| 3,706,723 A | 12/1972 | Chandrasekaran et al. |
| 4,599,386 A | 7/1986 | Carlson et al. |
| 4,743,658 A | 5/1988 | Imbalzano et al. |
| 2004/0242793 A1 | 12/2004 | Hiraga et al. |
| 2005/0201713 A1 | 9/2005 | Sato |
| 2007/0043187 A1 | 2/2007 | Okamoto et al. |
| 2011/0263785 A1 | 10/2011 | Kashiwagi |
| 2018/0312618 A1 | 11/2018 | Lannuzel et al. |
| 2019/0185600 A1 | 6/2019 | Saito et al. |
| 2021/0008775 A1 | 1/2021 | Imamura et al. |
| 2023/0060316 A1 | 3/2023 | Hishiki |

FOREIGN PATENT DOCUMENTS

| | | |
|---|---|---|
| CN | 109790250 A | 5/2019 |
| EP | 2 821 846 A1 | 1/2015 |
| EP | 2 821 847 A1 | 1/2015 |
| JP | S46-005642 Y1 | 2/1971 |
| JP | 61-98709 A | 5/1986 |
| JP | 62-104822 A | 5/1987 |
| JP | H08-012668 A | 1/1996 |
| JP | 2006-143702 A | 6/2006 |
| JP | 2007-504125 A | 3/2007 |
| JP | 4160918 B2 | 10/2008 |
| JP | 2018-532028 A | 11/2018 |
| JP | 2019-172967 A | 10/2019 |
| JP | 2020-139093 A | 9/2020 |
| JP | 7395338 B2 | 12/2023 |
| TW | 201035215 A | 10/2010 |
| WO | 99/46307 A1 | 9/1999 |
| WO | 2005/021526 A2 | 3/2005 |
| WO | 2013/129501 A1 | 9/2013 |
| WO | 2013/129503 A1 | 9/2013 |

OTHER PUBLICATIONS

Office Action dated Nov. 27, 2024, issued in counterpart TW Application No. 109142892, with English translation. (14 pages).
Office Action dated May 6, 2024, issued in counterpart TW application No. 109142892, with English translation. (14 pages).
International Search Report dated Feb. 16, 2021, issued in counterpart International Application No. PCT/JP2020/045276, w/English Translation. (7 pages).
Written Opinion of the International Searching Authority (Form PCT/ISA/237) dated Feb. 16, 2021, issued in counterpart International Application No. PCT/JP2020/045276, w/English Translation. (6 pages).
Mikes et al., "Synthesis and Characterization of an Amorphous Perfluoropolymer: Poly(perfluoro-2-methylene-4-methyl-1,3-dioxolane)", Macromolecules 2005, 38, pp. 4237-4245. Cited in ISR. (9 pages).

*Primary Examiner* — Catherine S Branch
(74) *Attorney, Agent, or Firm* — WHDA, LLP

(57) ABSTRACT

The present invention provides a method for manufacturing an optical resin composition that is less colored and that has a sufficiently low water absorbability. The optical resin composition manufacturing method according to the present invention includes performing a heat treatment of a fluorine-containing polymer under an atmosphere having a water vapor concentration of 100 volppm or less, the fluorine-containing polymer being obtained by polymerization of a monomer group including a fluorine-containing compound having a carbon-carbon double bond using an organic peroxide. In the optical resin composition manufacturing method, for example, the heat treatment causes thermal decomposition of a terminal group of the fluorine-containing polymer and volatilization of a low-molecular compound generated by the thermal decomposition.

9 Claims, No Drawings

OPTICAL RESIN COMPOSITION MANUFACTURING METHOD AND OPTICAL RESIN COMPOSITION

TECHNICAL FIELD

The present invention relates to an optical resin composition manufacturing method and an optical resin composition.

BACKGROUND ART

Resin compositions including a fluorine-containing polymer is used in a wide range of fields as the material of optical members such as plastic optical fibers (hereinafter referred to as "POF") and exposure members. A resin composition used as the material of an optical member is herein referred to as "optical resin composition".

A fluorine-containing polymer can be produced, for example, by polymerization of a monomer group using a polymerization initiator, the monomer group including a fluorine-containing compound having a carbon-carbon double bond. An organic peroxide is commonly used as the polymerization initiator used for polymerization of the monomer group including the fluorine-containing compound.

CITATION LIST

Patent Literature

Patent Literature 1: JP 4160918 B2

SUMMARY OF INVENTION

Technical Problem

To produce an optical member, an optical resin composition is, for example, molten by heating and then molded. Coloring of the composition can happen during this heat-molding. This coloring is particularly significant in the case of melting an optical resin composition in a bulk state by heating. According to studies by the present inventor, coloring of an optical resin composition is attributable to a polymerization-initiator-derived terminal group of a fluorine-containing polymer.

The present inventor made further studies on the basis of this finding and found that prior decomposition of the terminal group of the fluorine-containing polymer can produce an optical resin composition that is less colored but that has an increased water absorbability. In the optical member field, it is known that water increases an optical absorption loss (e.g., Patent Literature 1).

Therefore, the present invention aims to provide a method for manufacturing an optical resin composition that is less colored and that has a sufficiently low water absorbability.

Solution to Problem

The present invention provides an optical resin composition manufacturing method including performing a heat treatment of a fluorine-containing polymer under an atmosphere having a water vapor concentration of 100 volppm or less, the fluorine-containing polymer being obtained by polymerization of a monomer group including a fluorine-containing compound having a carbon-carbon double bond using an organic peroxide.

Advantageous Effects of Invention

According to the present invention, a method for manufacturing an optical resin composition that is less colored and that has a sufficiently low water absorbability can be provided.

DESCRIPTION OF EMBODIMENTS

Hereinafter, embodiments of the present invention will be described in detail. The following description is not intended to limit the present invention to specific embodiments.

An optical resin composition manufacturing method according to the present embodiment includes performing a heat treatment of a fluorine-containing polymer under an atmosphere having a water vapor concentration of 100 volppm or less, the fluorine-containing polymer being obtained by polymerization of a monomer group including a fluorine-containing compound having a carbon-carbon double bond using an organic peroxide. Herein, the fluorine-containing polymer yet to undergo the heat treatment can be called "fluorine-containing polymer (A)", while the fluorine-containing polymer having undergone the heat treatment can be called "fluorine-containing polymer (B)". An optical resin composition obtained by the manufacturing method of the present embodiment includes the fluorine-containing polymer (B).

The fluorine-containing polymer (A) yet to undergo the heat treatment has a terminal group derived from a polymerization initiator (organic peroxide). This terminal group is, for example, an ester group. As later described, the fluorine-containing compound has, for example, a carbon-carbon double bond at a terminal thereof, and every hydrogen atom bonded to a carbon atom forming the double bond is substituted by a fluorine atom. The terminal group of the fluorine-containing polymer (A) formed from the fluorine-containing compound is, for example, represented by the following formula (4).

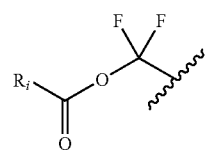

(4)

In the formula (4), $R_i$ depends on a structure of the organic peroxide and is, for example, a hydrocarbon group having 1 to 12 carbon atoms. A hydrogen atom included in the hydrocarbon group represented by $R_i$ may be substituted by a fluorine atom. The hydrocarbon group represented by $R_i$ may include an aromatic ring. For example, when perfluorobenzoyl peroxide is used as the organic peroxide, $R_i$ is a perfluorophenyl group. "Perfluoro" indicates that every hydrogen atom bonded to a carbon atom is substituted by a fluorine atom.

The heat treatment of the fluorine-containing polymer (A) causes thermal decomposition of the terminal group of the fluorine-containing polymer (A). In one example, the terminal group represented by the formula (4) undergoes a decomposition reaction represented by the following formula (5a).

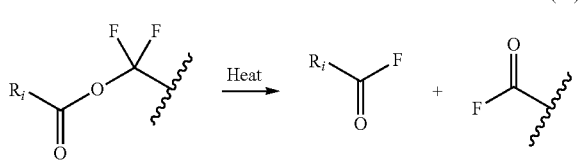

(5a)

As described above, in the manufacturing method of the present embodiment, the terminal group of the fluorine-containing polymer (A) can be turned into a functional group represented by the following formula (1) by the heat treatment. In other words, the fluorine-containing polymer (B) having undergone the heat treatment has a terminal group represented by the following formula (1). Carbon-13 nuclear magnetic resonance spectroscopy ($^{13}$C-NMR) may be used to confirm that the fluorine-containing polymer (B) has the terminal group represented by the following formula (1).

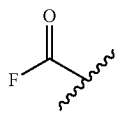

(1)

In the atmosphere of the heat treatment, the water vapor concentration is required to be 100 volppm or less and is preferably 50 volppm or less. The atmosphere of the heat treatment is preferably essentially free of water vapor, but may have a water vapor concentration of 0.1 volppm or more.

A component included in the atmosphere of the heat treatment is not particularly limited, but the atmosphere preferably includes an inert gas as a main component and more preferably consists essentially of an inert gas. The phrase "including an inert gas as a main component" as used herein means that a content of the inert gas in the atmosphere is highest on a weight basis. The phrase "consisting essentially of an inert gas" means that an inert gas content is 95 wt % or more and preferably 99 wt % or more in the atmosphere. The inert gas is, for example, a nitrogen gas or an argon gas and preferably a nitrogen gas. The atmosphere of the heat treatment preferably consists essentially of a nitrogen gas. The heat treatment may be performed in a pressure-reduced atmosphere or a vacuum atmosphere.

A temperature at which the heat treatment is performed is not particularly limited as long as the thermal decomposition of the terminal group of the fluorine-containing polymer (A) progresses. The temperature at which the heat treatment is performed is, for example, 100° C. or higher and 400° C. or lower and preferably 200° C. or higher and 350° C. or lower. A heat treatment duration is not particularly limited, either. The heat treatment duration is, for example, 50 minutes or more and may be 250 minutes or more. The heat treatment duration may be 1500 minutes or less. The fluorine-containing polymer (A) may be molten by the heat treatment and does not need to be molten by the heat treatment. Before the heat treatment, the fluorine-containing polymer (A) is, for example, but not particularly limited to, a powder.

The manufacturing method of the present embodiment further includes, for example, removing, from the resulting optical resin composition, a low-molecular compound (e.g., $R_i$—C(=O)—F) generated by the thermal decomposition of the terminal group of the fluorine-containing polymer (A). The method for removing the low-molecular compound from the optical resin composition is not particularly limited. For example, the low-molecular compound may be removed from the optical resin composition by appropriately adjusting the above heat treatment conditions (the temperature, the duration, and the like) to volatilize the low-molecular compound. In other words, in the manufacturing method of the present embodiment, the above heat treatment may cause thermal decomposition of the terminal group of the fluorine-containing polymer (A) and volatilization of the low-molecular compound generated by the thermal decomposition. In the case where the fluorine-containing polymer (A) is molten by the above heat treatment, the low-molecular compound generated by the thermal decomposition is easily volatilized when the height of a surface of the molten fluorine-containing polymer (A) is 1 mm or less. In the optical resin composition, a weight concentration of the low-molecular compound generated by the thermal decomposition of the terminal group of the fluorine-containing polymer (A) is, for example, 1% or less.

As described above, in the manufacturing method of the present embodiment, the organic-peroxide-derived terminal group of the fluorine-containing polymer (A) undergoes thermal decomposition by the heat treatment. That is, the fluorine-containing polymer (B) included in the optical resin composition hardly has the organic-peroxide-derived terminal group. Therefore, in a stage of heat-molding the optical resin composition into an optical member, the low-molecular compound is hardly generated by the thermal decomposition of the organic-peroxide-derived terminal group. According to studies by the present inventor, generation of a low-molecular compound in a stage of heat-molding an optical resin composition into an optical member tends to result in coloring of the optical resin composition. According to the manufacturing method of the present embodiment, the above low-molecular compound can be removed beforehand and, consequently, an optical resin composition that is less colored can be obtained.

Furthermore, in the manufacturing method of the present embodiment, the heat treatment is performed under an atmosphere having a water vapor concentration of 100 volppm or less. This can reduce further hydrolysis of the terminal group of the fluorine-containing polymer (B) during the heat treatment. If the terminal group represented by the formula (1) undergoes hydrolysis, a carboxyl group is formed by a reaction represented by the following formula (5b). An OH-containing functional group such as a carboxyl group tends to increase the water absorbability of the optical resin composition. According to the manufacturing method of the present embodiment, hydrolysis of the terminal group of the fluorine-containing polymer (B) is reduced, which makes it possible to reduce an increase in the water absorbability of the optical resin composition and maintain the water absorbability at a sufficiently low level.

(5b)

It should be noted that formation of an OH-containing functional group such as a carboxyl group increases intramolecular density fluctuation in the fluorine-containing polymer. The intramolecular density fluctuation can cause light scattering. In the manufacturing method of the present embodiment, reduction of hydrolysis of the terminal group of the fluorine-containing polymer (B) reduces an increase in intramolecular density fluctuation and thereby can reduce an increase in light scattering attributable to the optical resin composition.

[Fluorine-Containing Compound]

The fluorine-containing compound included in the monomer group is not particularly limited as long as the fluorine-containing compound includes a carbon-carbon double bond and a fluorine atom. In view of reducing light absorption attributable to stretching energy of a C—H bond, the fluorine-containing compound is preferably essentially free of a hydrogen atom, and particularly preferably, in the fluorine-containing compound, every hydrogen atom bonded to a carbon atom is substituted by a fluorine atom. The phrase "the fluorine-containing compound is essentially free of a hydrogen atom" as used herein means that a hydrogen atom content is 1 mol % or less in a total amount of the fluorine-containing compound included in the monomer group.

The carbon-carbon double bond included in the fluorine-containing compound is preferably at the terminal of the fluorine-containing compound. Furthermore, every hydrogen atom bonded to a carbon atom forming the double bond is preferably substituted by a fluorine atom.

The fluorine-containing compound preferably has a fluorine-containing aliphatic ring structure. The fluorine-containing compound may have a polymerizable double bond between a carbon atom forming a ring and a carbon atom not forming a ring or may have a polymerizable double bond between two carbon atoms each forming a ring. Examples of the fluorine-containing compound having a polymerizable double bond between a carbon atom forming a ring and a carbon atom not forming a ring include fluorine-containing compounds, such as perfluoro-2-methylene-4-methyl-1,3-dioxolane, having a 1,3-dioxolane structure. Examples of the fluorine-containing compound having a polymerizable double bond between two carbon atoms each forming a ring include fluorine-containing compounds, such as perfluoro-4-methyl-1,3-dioxole and perfluoro-4-methyl-1,3-dioxole, having a 1,3-dioxole structure.

The fluorine-containing compound can be obtained by a known manufacturing method such as a manufacturing method disclosed in JP 2007-504125 A. Examples of the fluorine-containing compound having a fluorine-containing aliphatic ring structure include a compound represented by the following formula (2).

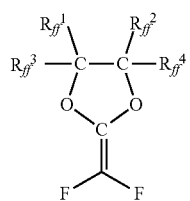

(2)

In the formula (2), $R_{ff}^1$ to $R_{ff}^4$ each independently represent a fluorine atom, a perfluoroalkyl group having 1 to 7 carbon atoms, or a perfluoroalkyl ether group having 1 to 7 carbon atoms. $R_{ff}^1$ and $R_{ff}^2$ are optionally linked to form a ring. In the formula (2), the number of carbon atoms in the perfluoroalkyl group is preferably 1 to 5, more preferably 1 to 3, and even more preferably 1. The perfluoroalkyl group may be linear or branched. Examples of the perfluoroalkyl group include a trifluoromethyl group, a pentafluoroethyl group, and a heptafluoropropyl group.

In the formula (2), the number of carbon atoms in the perfluoroalkyl ether group is preferably 1 to 5 and more preferably 1 to 3. The perfluoroalkyl ether group may be linear or branched. Examples of the perfluoroalkyl ether group include a perfluoromethoxymethyl group.

When $R_{ff}^1$ and $R_{ff}^2$ are linked to form a ring, the ring may be a five-membered ring or a six-membered ring. Examples of the ring include a perfluorotetrahydrofuran ring, a perfluorocyclopentane ring, and a perfluorocyclohexane ring.

Specific examples of the compound represented by the above formula (2) include compounds represented by the following formulae (M1) to (M8).

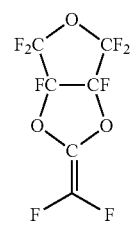

(M1)

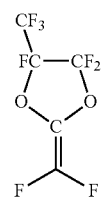

(M2)

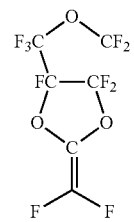

(M3)

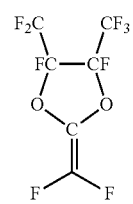

(M4)

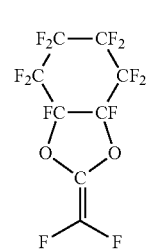

(M5)

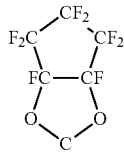
(M6)

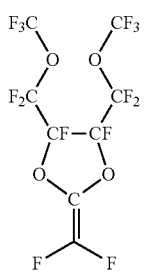
(M7)

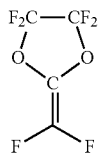
(M8)

Among the compounds represented by the above formulae (M1) to (M8), the compound represented by the formula (2) is preferably the compound represented by the formula (M2), i.e., the compound represented by the following formula (3).

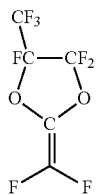
(3)

The fluorine-containing compound included in the monomer group may be one fluorine-containing compound or may be two or more fluorine-containing compounds. That is, the fluorine-containing polymer (A) may be a fluorine-containing polymer obtained by homopolymerization of one fluorine-containing compound, or may be a fluorine-containing copolymer obtained by copolymerization of two or more fluorine-containing compounds.

The fluorine-containing polymer (A) may be a fluorine-containing copolymer, for example, obtained by copolymerization of the above fluorine-containing compound (hereinafter referred to as "fluorine-containing compound (a)") having a fluorine-containing aliphatic ring structure and an additional fluorine-containing compound other than the fluorine-containing compound (a). Examples of the additional fluorine-containing compound other than the fluorine-containing compound (a) include the following fluorine-containing compounds (b) to (d).

The fluorine-containing compound (b) is a fluorine-containing vinyl ether such as perfluorovinyl ether. The fluorine-containing vinyl ether is, for example, represented by the following formula (6).

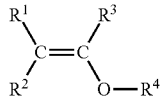
(6)

In the formula (6), $R^1$ to $R^3$ each independently represent a fluorine atom or a perfluoroalkyl group having 1 to 7 carbon atoms. $R^4$ represents a perfluoroalkyl group having 1 to 7 carbon atoms. The perfluoroalkyl group may have a ring structure. One or some of the fluorine atoms represented by $R^1$ to $R^3$ may each be substituted by a halogen atom other than a fluorine atom. One or some of fluorine atoms in the perfluoroalkyl group may each be substituted by a halogen atom other than a fluorine atom.

The fluorine-containing compound (c) is a fluorine-containing olefin such as tetrafluoroethylene or chlorotrifluoroethylene. The fluorine-containing olefin is, for example, represented by the following formula (7).

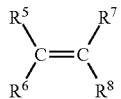
(7)

In the formula (7), $R^5$ to $R^8$ each independently represent a fluorine atom or a perfluoroalkyl group having 1 to 7 carbon atoms. The perfluoroalkyl group may have a ring structure. One or some of the fluorine atoms represented by $R^5$ to $R^8$ may each be substituted by a halogen atom other than a fluorine atom. One or some of fluorine atoms in the perfluoroalkyl group may each be substituted by a halogen atom other than a fluorine atom.

The fluorine-containing compound (d) is a fluorine-containing compound having two or more polymerizable double bonds and being cyclopolymerizable. The fluorine-containing compound (d) is, for example, represented by the following formula (8).

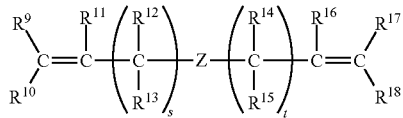
(8)

In the formula (8), Z represents an oxygen atom, a single bond, or $-OC(R^{19}R^{20})O-$, $R^9$ to $R^{20}$ each independently represent a fluorine atom, a perfluoroalkyl group having 1 to 5 carbon atoms, or a perfluoroalkoxy group having 1 to 5 carbon atoms. One or some of the fluorine atoms represented by $R^9$ to $R^{20}$ may each be substituted by a halogen atom other than a fluorine atom. One or some of fluorine atoms in the perfluoroalkyl group may each be substituted by a halogen atom other than a fluorine atom. One or some of fluorine atoms in the perfluoroalkoxy group may each be substituted by a halogen atom other than a fluorine atom. The symbols s and t are each independently 0 to 5, and s+t represents an integer of 1 to 6 (when Z is $-OC(R^{19}R^{20})O-$, s+t may be 0).

The fluorine-containing compound represented by the following formula (9) may be used as the fluorine-containing compound (d). The fluorine-containing compound represented by the following formula (9) is a fluorine-containing compound represented by the above formula (8), where Z is an oxygen atom, s is 0, and t is 2.

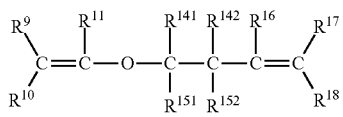

(9)

In the formula (9), $R^{141}$, $R^{142}$, $R^{151}$, $R^{152}$ each independently represent a fluorine atom, a perfluoroalkyl group having 1 to 5 carbon atoms, or a perfluoroalkoxy group having 1 to 5 carbon atoms. One or some of the fluorine atoms represented by $R^{141}$, $R^{142}$, $R^{151}$, and $R^{152}$ may each be substituted by a halogen atom other than a fluorine atom. One or some of fluorine atoms in the perfluoroalkyl group may each be substituted by a halogen atom other than a fluorine atom. One or some of fluorine atoms in the perfluoroalkoxy group may each be substituted by a halogen atom other than a fluorine atom.

Specific examples of the fluorine-containing compound (d) include the following compounds.
$CF_2$=$CFOCF_2CF$=$CF_2$
$CF_2$=$CFOCF(CF_3)CF$=$CF_2$
$CF_2$=$CFOCF_2CF_2CF$=$CF_2$
$CF_2$=$CFOCF_2CF(CF_3)CF$=$CF_2$
$CF_2$=$CFOCF(CF_3)CF_2CF$=$CF_2$
$CF_2$=$CFOCFClCF_2CF$=$CF_2$
$CF_2$=$CFOCCl_2CF_2CF$=$CF_2$
$CF_2$=$CFOCF_2OCF$=$CF_2$
$CF_2$=$CFOC(CF_3)_2OCF$=$CF_2$
$CF_2$=$CFOCF_2CF(OCF_3)CF$=$CF_2$
$CF_2$=$CFCF_2CF$=$CF_2$
$CF_2$=$CFCF_2CF_2CF$=$CF_2$
$CF_2$=$CFCF_{20}CF_2CF$=$CF_2$
$CF_2$=$CFOCF_2CFClCF$=$CF_2$
$CF_2$=$CFOCF_2CF_2CCl$=$CF_2$
$CF_2$=$CFOCF_2CF_2CF$=$CFCl$
$CF_2$=$CFOCF_2CF(CF_3)CCl$=$CF_2$
$CF_2$=$CFOCF_2OCF$=$CF_2$
$CF_2$=$CFOCCl_2OCF$=$CF_2$
$CF_2$=$CClOCF_2OCCl$=$CF_2$

[Monomer Group]

The monomer group preferably include the above fluorine-containing compound as a main component, and more preferably consists essentially of the fluorine-containing compound. The monomer group may further include an additional polymerizable compound other than the fluorine-containing compound.

[Organic Peroxide]

In the manufacturing method of the present embodiment, the organic peroxide functions as a polymerization initiator for the monomer group. The organic peroxide preferably includes a diacyl peroxide or a perester, and more preferably includes a diacyl peroxide. The organic peroxide is preferably fluorinated. The organic peroxide is more preferably essentially free of a hydrogen atom and fully fluorinated. The phrase that "the organic peroxide is essentially free of a hydrogen atom" as used herein means that a hydrogen atom content is 1 mol % or less in a total amount of the organic peroxide used. A preferred example of the organic peroxide is perfluorobenzoyl peroxide.

[Fluorine-Containing Polymer (A) Manufacturing Method]

The fluorine-containing polymer (A) can be manufactured by polymerization of the above monomer group using the above organic peroxide. A known polymerization method can be used for the polymerization. For example, the fluorine-containing polymer (A) can be manufactured by radical polymerization of the above monomer group by a conventional method.

[Fluorine-Containing Polymer]

As described above, the fluorine-containing polymers (A) and (B) have different terminal groups. Except for the terminal group, the structure of the fluorine-containing polymer (A) may be the same as that of the fluorine-containing polymer (B). Hereinafter, a structural unit that the fluorine-containing polymers (A) and (B) have in common will be described.

The fluorine-containing polymer includes, for example, a structural unit (a) represented by the following formula (10). The structural unit (a) is derived from the above fluorine-containing compound (a). In the formula (10), $R_{ff}^1$ to $R_{ff}^4$ are as described in the formula (2).

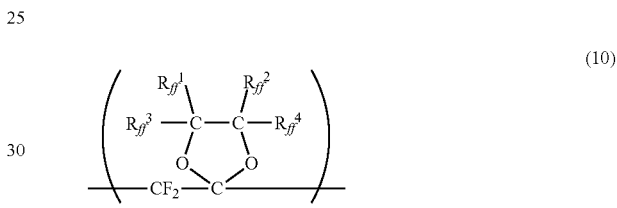

(10)

Specific examples of the structural unit (a) include structural units represented by the following formulae (a1) to (a8).

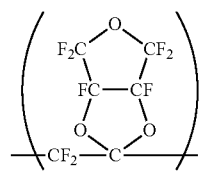

(a1)

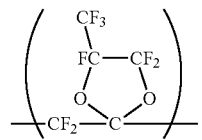

(a2)

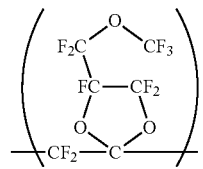

(a3)

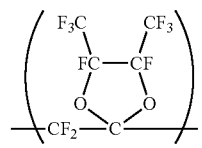

(a4)

-continued

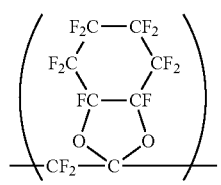
(a5)

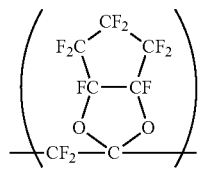
(a6)

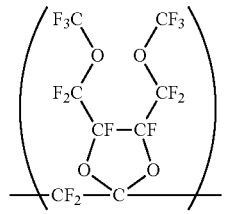
(a7)

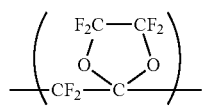
(a8)

Among the structural units represented by the above formulae (a1) to (a8), the structural unit (a) is preferably the structural unit (a2), i.e., a structural unit represented by the following formula (11).

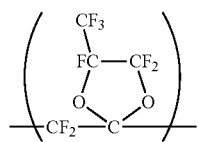
(11)

The fluorine-containing polymer may include one or more structural units (a). In the fluorine-containing polymer, a content of the structural unit (a) is preferably 20 mol % or more and more preferably 40 mol % or more in a total amount of all structural units. When including 20 mol % or more of the structural unit (a), the fluorine-containing polymer tends to have much higher thermal resistance. When including 40 mol % or more of the structural unit (a), the fluorine-containing polymer tends to have much higher transparency and much higher mechanical strength in addition to high thermal resistance. In the fluorine-containing polymer, the content of the structural unit (a) is preferably 95 mol % or less and more preferably 70 mol % or less in the total amount of all structural units.

The fluorine-containing polymer may further include an additional structural unit other than the structural unit (a). Examples of the additional structural unit include the following structural units (b) to (d).

The structural unit (b) is represented by the following formula (12). The structural unit (b) is derived from the above fluorine-containing compound (b). In the formula (12), $R^1$ to $R^4$ are as described in the formula (6).

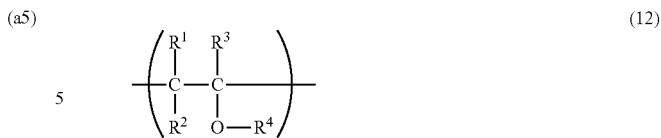
(12)

The fluorine-containing polymer may include one or more structural units (b). In the fluorine-containing polymer, a content of the structural unit (b) is preferably 5 to 10 mol % in the total amount of all structural units. The content of the structural unit (b) may be 9 mol % or less or 8 mol % or less.

The structural unit (c) is represented by the following formula (13). The structural unit (c) is derived from the above fluorine-containing compound (c). In the formula (13), $R^5$ to $R^8$ are as described in the formula (7).

(13)

The fluorine-containing polymer may include one or more structural units (c). In the fluorine-containing polymer, a content of the structural unit (c) is preferably 5 to 10 mol % in the total amount of all structural units. The content of the structural unit (c) may be 9 mol % or less or 8 mol % or less.

The structural unit (d) is represented by the following formula (14). The structural unit (d) is derived from the above fluorine-containing compound (d). In the formula (14), Z, $R^9$ to $R^{18}$, s, and t are as described in the formula (8).

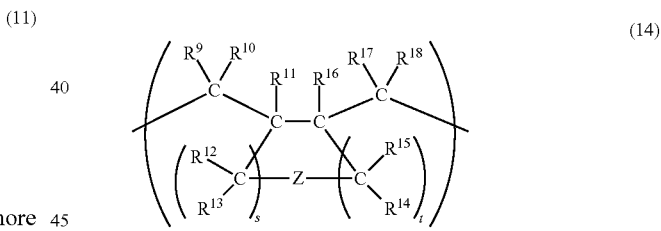
(14)

The structural unit (d) is preferably represented by the following formula (15). The structural unit (d) represented by the following formula (15) is derived from a fluorine-containing compound represented by the formula (9). In the formula (15), $R^{141}$, $R^{142}$, $R^{151}$, and $R^{152}$ are as described in the formula (9).

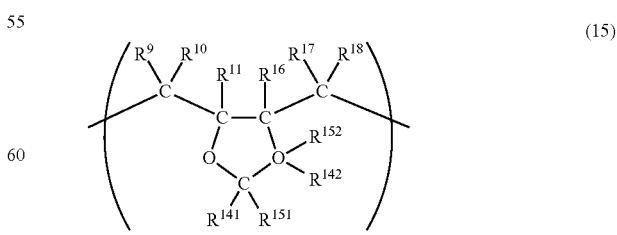
(15)

The fluorine-containing polymer may include one or more structural units (d). In the fluorine-containing polymer, a content of the structural unit (d) is preferably 30 to 67 mol % in the total amount of all structural units. The content of the structural unit (d) is, for example, 35 mol % or more, and may be 60 mol % or less or 55 mol % or less.

The fluorine-containing polymer may further include an additional structural unit other than the structural units (a) to (d), but is preferably essentially free of an additional structural unit other than the structural units (a) to (d). The phrase "the fluorine-containing polymer is essentially free of an additional structural unit other than the structural units (a) to (d)" means that a total content of the structural units (a) to (d) is 95 mol % or more and preferably 98 mol % or more in the total amount of all structural units in the fluorine-containing polymer.

A glass transition temperature (Tg) of the fluorine-containing polymer is, for example, but not particularly limited to, 100° C. to 140° C., and may be 105° C. or higher or 120° C. or higher. The term "Tg" herein refers to a midpoint glass transition temperature ($T_{mg}$) determined according to JIS K 7121: 1987.

[Optical Resin Composition]

The optical resin composition obtained by the manufacturing method of the present embodiment includes the fluorine-containing polymer (B) and preferably consists essentially of the fluorine-containing polymer (B). The optical resin composition may further include an additive such as a refractive index modifier.

As described above, according to the manufacturing method of the present embodiment, hydrolysis of the terminal group of the fluorine-containing polymer (B) is reduced and thus the water absorbability of the optical resin composition is sufficiently low. A water absorption rate of the optical resin composition is, for example, 0.1% or less and preferably 0.05% or less. The water absorption rate of the optical resin composition can be determined by the following method. First, the optical resin composition is set as a measurement sample in a commercially-available moisture sorption analyzer. Next, the measurement sample is held at 85° C. and 0% RH for 600 minutes and then at 85° C. and 85% RH for 600 minutes. If the measurement sample absorbs water vapor (absorbs moisture) in the analyzer during this moisture absorption treatment, the weight of the measurement sample increases. A ratio of an additional weight of the measurement sample to the weight of the measurement sample having undergone the moisture absorption treatment is determined as the water absorption rate, the additional weight being added by the moisture absorption treatment.

Moreover, since the water absorbability of the optical resin composition is sufficiently low, a content of water in (a water content of) the optical resin composition is also maintained at a low level. The water content of the optical resin composition is, for example, 0.1 wt % or less, preferably 0.07 wt % or less, and more preferably 0.05 wt % or less. The lower limit of the water content of the optical resin composition is not particularly limited, and is, for example, 0.01 wt %.

The optical resin composition obtained by the manufacturing method of the present embodiment is less likely to be colored when heat-molded into an optical member. Moreover, because of the low water content of the optical resin composition, an optical absorption loss attributable to water contained in the optical resin composition is low. Consequently, a formed body produced from the optical resin composition has a sufficiently low internal transmittance. In one example, for a sheet-shaped formed body having a thickness of 10 mm and produced from the optical resin composition, the internal transmittance of light with a wavelength of 850 nm is, for example, 98% or more and preferably 99% or more. The term "internal transmittance" as used herein means a transmittance excluding a reflection loss attributable to reflection (Fresnel reflection) of light at a surface of a formed body. The internal transmittance of a formed body can be determined according to Japanese Optical Glass Industrial Standards (JOGIS) 17-2012.

EXAMPLES

Hereinafter, the present invention will be described in more detail with reference to examples and comparative examples. However, the present invention is not limited to these.

[Fluorine-Containing Polymer (A)]

First, 22.6 g of perfluoro-2-methylene-4-methyl-1,3-dioxolane (a compound represented by the formula (M2)) was dissolved in 50 mL of 1,1,1,2,2,3,4,5,5,5-decafluoropentane (Vertrel XF manufactured by Chemours-Mitsui Fluoroproducts Co., Ltd.) under an argon atmosphere at room temperature (20° C.±15° C.). While the argon atmosphere was being maintained, 0.155 g of perfluorobenzoyl peroxide was added to the solution, and the resulting mixture was stirred and mixed. Next, dissolved oxygen was removed from the solution by a freeze-pump-thaw technique. The solution was heated at 40° C. under stirring to undergo a reaction for 72 hours. The resulting reaction mixture was added to 300 mL of chloroform. The precipitate generated thereby was collected by filtration. The obtained residue was a polymer (the fluorine-containing polymer (A)) of perfluoro-2-methylene-4-methyl-1,3-dioxolane. The yield of the fluorine-containing polymer (A) was 19.2 g, and the percentage yield was 81.0%.

(Sample 1)

First, a sheet of aluminum foil was placed on an aluminum tray, and a powder of the fluorine-containing polymer (A) was then placed on a glossy side of the aluminum foil. The tray was placed in an oven, and the fluorine-containing polymer (A) was subjected to a heat treatment under a nitrogen atmosphere at 270° C. for 5 hours. The nitrogen atmosphere was adjusted by blowing nitrogen into the oven at a flow rate of 1 L/min. The water vapor concentration in the nitrogen atmosphere was 40 volppm. The fluorine-containing polymer (A) was molten by the heat treatment. The height of a surface of the molten fluorine-containing polymer (A) was 1 mm or less. The heat treatment also caused thermal decomposition of a terminal group of the fluorine-containing polymer (A) and volatilized a low-molecular compound generated by the thermal decomposition. An optical resin composition of Sample 1 was obtained in this manner. The optical resin composition of the sample 1 cooled to room temperature was in the shape of a sheet having a thickness of 1 mm or less.

(Sample 2)

An optical resin composition of Sample 2 was obtained in the same manner as for the sample 1, except that the heat treatment duration was changed to 24 hours.

(Sample 3)

An optical resin composition of Sample 3 was obtained in the same manner as for the sample 1, except that the heat treatment was performed in air. The water vapor concentration in air was 1.4 vol %.

(Sample 4)

An optical resin composition of Sample 4 was obtained in the same manner as for the sample 3, except that the heat treatment duration was changed to 24 hours.

[Water Absorption Rate]

The optical resin compositions of Samples 1 to 4 were measured for their water absorption rates. First, a 1 cm³ measurement sample was cut out of each optical resin composition. This measurement sample was set in a moisture sorption analyzer (IGA-SORP manufactured by Hiden Isochema Ltd.). Next, the measurement sample was held at 85° C. and 0% RH for 600 minutes and then at 85° C. and 85% RH for 600 minutes. A ratio of an additional weight of the measurement sample to the weight of the measurement sample having undergone the moisture absorption treatment was determined as the water absorption rate, the additional weight being added by the moisture absorption treatment. Table 1 shows the results. In Table 1, ○ means that the water absorption rate is 0.05% or less. The symbol × means that the water absorption rate is greater than 0.05%.

[Internal Transmittance]

For sheet-shaped formed bodies having a thickness of 10 mm and produced from the optical resin compositions of Samples 1 to 4, the internal transmittance of light with a wavelength of 850 nm was determined in the following manner according to JOGIS 17-2012. First, a cylindrical tube was formed of aluminum foil, and a bottom surface of the cylindrical tube was covered with a polyimide tape. Each of the optical resin composition was filled in the cylindrical tube. The cylindrical tube was then set in a Hastelloy container for production of rods. A vacuum atmosphere was created in the inside of the container, and the temperature of the container was increased to 270° C. over about 2 hours. After the temperature of the container reached 270° C., the container was heated at 270° C. for 3 hours. Subsequently, the container was slowly cooled to room temperature to mold a rod out of the optical resin composition. The rod was in the shape of a 20 mm thick cylindrical column having a 20 mm diameter bottom surface.

Next, a 5 mm thick disc D1 and a 12 mm thick disc D2 were cut out from the rod using a diamond wheel saw. Then, the disc D1 was placed inside a sample cup. Before the disc D1 was placed, a carbon tape was adhered to a bottom surface of the disc D1, and the disc D1 was fixed to the sample cup using the carbon tape. Subsequently, the sample cup was filled with a resin composition (EPOFIX manufactured by Struers), which was then cured. A measurement sample S1 was obtained in this manner. The measurement sample S1 was in the shape of an about 5 mm thick cylindrical column having a 25 mm diameter bottom surface.

Next, the measurement sample S1 was set in a sample holder of an automatic tabletop grinder, and the following steps 1 to 6 were performed for a bottom surface of the measurement sample S1, the bottom surface having the carbon tape adhered thereto.

Step 1: Grinding the bottom surface with "SiC Paper #1000" to remove the carbon tape
Step 2: Grinding the bottom surface with "MD Sat 9 µm" manufactured by Struers for 5 minutes
Step 3: Grinding the bottom surface with "MD Sat 6 µm" manufactured by Struers for 5 minutes
Step 4: Grinding the bottom surface with "MD Dur 3 µm" manufactured by Struers for 10 minutes
Step 5: Grinding the bottom surface with "MD Nap 1 µm" manufactured by Struers for 5 minutes
Step 6: Grinding the bottom surface with "MD Chem OP-S" manufactured by Struers for 5 minutes The bottom surface ground in the steps 1 to 6 was protected by a sheet of filter paper. Then, the measurement sample S1 was set in a surface grinding jig, and a surface (upper surface) opposite to the bottom surface of the measurement sample S1 was ground. This grinding was performed using "SiC Paper #220" until the thickness of the measurement sample S1 became about 4 mm. During the grinding, The thickness of the measurement sample S1 was checked using a digital micrometer. Moreover, the upper surface of the measurement sample S1 was ground using "SiC Paper #1000" until the thickness of the measurement sample S1 became about 3.5 mm. Furthermore, the above steps 2 to 6 were performed for the upper surface of the measurement sample S1 to obtain the measurement sample S1 having a thickness of about 3.5 mm.

Next, a measurement sample S2 having a thickness of 10 mm was obtained from the disc D2 in the same manner as for the measurement sample S1. Before ground, the measurement sample S2 was in the shape of an about 12 mm thick cylindrical column having a 25 mm diameter bottom surface. An upper surface of the measurement sample S2 was ground using "SiC Paper #220" until the thickness of the measurement sample S2 became about 11 mm. The upper surface of the measurement sample S2 was ground using "SiC Paper #1000" until the thickness of the measurement sample S2 became about 10.5 mm.

Next, a spectral transmittance including a reflection loss attributable to Fresnel reflection was measured for each of the measurement samples S1 and S2 according to JIS Z 8722: 2009. The spectral transmittance measurement was performed at a measurement wavelength of 200 nm to 1300 nm, a sampling interval of 1 nm, and a scan rate of 600 nm/min using a ultraviolet-visible-near-infrared spectrophotometer UH4150 manufactured by Hitachi High-Tech Science Corporation. From the obtained spectral transmittances, an internal transmittance of light with a wavelength of 850 nm was determined by the following mathematical expression (1) for a sheet-shaped formed body having a thickness of 10 mm and produced from the optical resin composition. Table 1 shows the results.

$$\tau = 10^a \quad (1)$$

In the above mathematical expression (1), $\tau$ represents the internal transmittance of a sheet-shaped formed body having a thickness of L mm (10 mm). The symbol a is a value calculated by the following mathematical expression (2). In the mathematical expression (2), $d_1$ represents the thickness (mm) of the measurement sample S1, and $d_2$ represents the thickness (mm) of the measurement sample S2. $T_1$ represents the transmittance of light with a wavelength of 850 nm through the measurement sample S1, and $T_2$ represents the transmittance of light with a wavelength of 850 nm through the measurement sample S2. $T_1$ and $T_2$ include a reflection loss attributable to Fresnel reflection.

$$a = -\frac{\log_{10} T_1 - \log_{10} T_2}{d_2 - d_1} \times L \quad (2)$$

In Table 1, ○ means that the internal transmittance determined by the above method is 98% or more. The symbol × means that the internal transmittance determined by the above method is less than 98%.

TABLE 1

| Sample | Heating treatment atmosphere | Heating treatment conditions | Water absorption rate | Internal transmittance |
|---|---|---|---|---|
| 1 | Nitrogen (flow rate: 1 L/min) | 270° C./5 h | ○ | ○ |
| 2 | Nitrogen (flow rate: 1 L/min) | 270° C./24 h | ○ | ○ |
| 3 | Air | 270° C./5 h | x | x |
| 4 | Air | 270° C./24 h | x | x |

Water absorption rate ○: 0.05%; x: >0.05%
Internal transmittance ○: 98%/10 mm; x: <98%/10 mm As can be understood from Table 1, the optical resin compositions of Samples 1 and 2 obtained by the heat treatment of the fluorine-containing polymer (A) under an atmosphere having a water vapor concentration of 100 volppm or less had a lower water absorption rate than that of the optical resin compositions of Sample 3 and 4 obtained by the heat treatment of the fluorine-containing polymer (A) under an atmosphere having a water vapor concentration higher than 100 volppm. Since the optical resin compositions of Samples 1 and 2 had low water absorption rates and hardly included water, the sheet-shaped formed bodies having a thickness of 10 mm and produced from the optical resin compositions of Samples 1 and 2 had high internal transmittances of light with a wavelength of 850 nm.

INDUSTRIAL APPLICABILITY

An optical resin composition obtained by the manufacturing method of the present embodiment is suitable as the material of optical members such as plastic optical fibers, optical waveguides, optical lenses, prisms, and photolithographic masks, and is particularly suitable for the material of plastic optical fibers, optical waveguides, and optical lenses.

The invention claimed is:

1. An optical resin composition manufacturing method comprising performing a heat treatment of a fluorine-containing polymer under an atmosphere having a water vapor concentration of 100 volppm or less and including an inert gas as a main component, the fluorine-containing polymer being obtained by polymerization of a monomer group including a fluorine-containing compound having a carbon-carbon double bond using an organic peroxide.

2. The method according to claim 1, wherein the heat treatment causes thermal decomposition of a terminal group of the fluorine-containing polymer and volatilization of a low-molecular compound generated by the thermal decomposition.

3. The method according to claim 1, wherein a terminal group of the fluorine-containing polymer is turned into a functional group represented by the following formula (1) by the heat treatment:

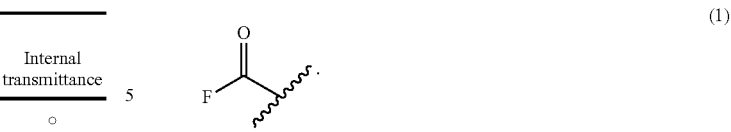

(1)

4. The method according to claim 1, wherein the organic peroxide includes a diacyl peroxide or a perester.

5. The method according to claim 1, wherein the atmosphere consists essentially of a nitrogen gas.

6. The method according to claim 1, wherein a temperature at which the heat treatment is performed is 100° C. or higher and 400° C. or lower.

7. The method according to claim 1, wherein
the carbon-carbon double bond is at a terminal of the fluorine-containing compound, and
the fluorine-containing compound has a structure in which every hydrogen atom bonded to a carbon atom forming the double bond is substituted by a fluorine atom.

8. The method according to claim 1, wherein the fluorine-containing compound is represented by the following formula (2):

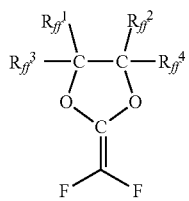

(2)

where $R_{ff}^1$ to $R_{ff}^4$ each independently represent a fluorine atom, a perfluoroalkyl group having 1 to 7 carbon atoms, or a perfluoroalkyl ether group having 1 to 7 carbon atoms, and $R_{ff}^1$ and $R_{ff}^2$ are optionally linked to form a ring.

9. The method according to claim 8, wherein the fluorine-containing compound is represented by the following formula (3):

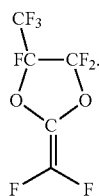

(3)

* * * * *